United States Patent
Zogg et al.

(10) Patent No.: US 9,377,298 B2
(45) Date of Patent: Jun. 28, 2016

(54) SURFACE DETERMINATION FOR OBJECTS BY MEANS OF GEODETICALLY PRECISE SINGLE POINT DETERMINATION AND SCANNING

(71) Applicant: Leica Geosystems AG, Heerbrugg (CH)

(72) Inventors: Hans-Martin Zogg, Uttwil (CH); Norbert Kotzur, Altstätten (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 175 days.

(21) Appl. No.: 14/245,788

(22) Filed: Apr. 4, 2014

(65) Prior Publication Data

US 2014/0298666 A1    Oct. 9, 2014

(30) Foreign Application Priority Data

Apr. 5, 2013 (EP) .................................... 13162633

(51) Int. Cl.
*G01C 15/02* (2006.01)
*G01B 11/27* (2006.01)
*G01C 15/00* (2006.01)

(52) U.S. Cl.
CPC .............. *G01B 11/27* (2013.01); *G01C 15/002* (2013.01)

(58) Field of Classification Search
CPC .... G01B 11/27; G01C 15/004; G01C 15/002; G01C 1/02; G01S 13/02
USPC .................................................. 33/1 CC, 290
See application file for complete search history.

(56) References Cited

U.S. PATENT DOCUMENTS

| 5,886,340 | A | | 3/1999 | Suzuki et al. |
| 5,988,862 | A | * | 11/1999 | Kacyra ................. G01B 11/002 382/195 |
| 6,072,642 | A | | 6/2000 | Shirai |
| 6,433,858 | B1 | | 8/2002 | Suzuki |
| 6,504,602 | B1 | | 1/2003 | Hinderling |

(Continued)

FOREIGN PATENT DOCUMENTS

| CN | 1761855 A | 4/2006 |
| CN | 101614807 A | 12/2009 |

(Continued)

OTHER PUBLICATIONS

European Search Report dated Sep. 16, 2013 as received in Application No. EP 13 16 2633.

*Primary Examiner* — Christopher Fulton
(74) *Attorney, Agent, or Firm* — Maschoff Brennan (57) ABSTRACT

A method for surveying an object for and/or using a geodetic surveying device that include a derivation of an item of surface information at least for one object region, at least one geodetically precise single point determination for the object region, wherein a position of at least one object point is determined geodetically precisely, and an update of the item of surface information based on the determined position of the at least one object point. In some embodiments a scan to derive the item of surface information may be performed using object-point-independent scanning of the object region by progressive alignment changes of the measuring radiation, with a determination of a respective distance and of a respective alignment of the measuring radiation emitted for the distance measurement for scanning points lying within the object region, and having a generation of a point cloud which represents the item of surface information.

20 Claims, 4 Drawing Sheets

(56) References Cited

U.S. PATENT DOCUMENTS

| | | |
|---|---|---|
| 7,583,373 B2 | 9/2009 | Schwarz |
| 7,633,610 B2 | 12/2009 | Walser |
| RE41,175 E * | 3/2010 | Vashisth ............... G01C 11/02 342/357.31 |
| 7,672,049 B2 | 3/2010 | Fruhmann |
| 8,224,030 B2 | 7/2012 | Otani et al. |
| 8,294,769 B2 | 10/2012 | Otani et al. |
| 8,331,624 B2 * | 12/2012 | Braunecker ............. G01C 1/04 382/106 |
| 8,934,009 B2 * | 1/2015 | Kumagai ................ G01C 3/08 348/135 |
| 2003/0103048 A1 * | 6/2003 | Kindratenko ........... G06T 15/40 345/421 |
| 2005/0057745 A1 | 3/2005 | Bontje |
| 2005/0223337 A1 * | 10/2005 | Wheeler ............. G06F 3/04845 715/806 |
| 2006/0110026 A1 * | 5/2006 | Strassenburg-Kleciak G01C 15/00 382/154 |
| 2009/0105986 A1 * | 4/2009 | Staab ................... G01C 15/002 702/151 |
| 2009/0202109 A1 * | 8/2009 | Clar ....................... G01C 15/00 382/104 |
| 2011/0282578 A1 * | 11/2011 | Miksa ............... G06F 17/30241 701/532 |
| 2012/0014564 A1 | 1/2012 | Jensen |
| 2012/0057174 A1 | 3/2012 | Briggs |
| 2013/0176305 A1 * | 7/2013 | Ito .......................... G06T 17/00 345/420 |
| 2014/0088915 A1 * | 3/2014 | Vogel .................... G01C 15/00 702/150 |
| 2015/0029489 A1 * | 1/2015 | Metzler ................ G01C 15/002 356/4.01 |
| 2015/0070352 A1 * | 3/2015 | Jones .................... G06T 7/0071 345/420 |
| 2015/0153444 A1 * | 6/2015 | Nichols ................. G01S 13/726 342/385 |

FOREIGN PATENT DOCUMENTS

| | | |
|---|---|---|
| CN | 101957197 A | 1/2011 |
| DE | 197 107 22 A1 | 10/1997 |
| DE | 199 267 06 A1 | 12/1999 |
| DE | 199 495 80 A1 | 4/2000 |
| EP | 1 081 459 A1 | 3/2001 |
| EP | 1 662 278 A1 | 5/2006 |
| EP | 1 686 350 A1 | 8/2006 |
| EP | 2 141 450 A1 | 1/2010 |
| EP | 2 219 011 A1 | 8/2010 |
| WO | 2005/028999 A2 | 3/2005 |

\* cited by examiner

SURFACE DETERMINATION FOR OBJECTS BY MEANS OF GEODETICALLY PRECISE SINGLE POINT DETERMINATION AND SCANNING

FIELD OF THE INVENTION

Embodiments of the invention relate to a method for object surveying for and using a geodetic surveying device, a geodetic surveying device, a system composed of a geodetic surveying device, a GNSS receiving unit, and a computer program product.

Numerous geodetic surveying devices have been known since antiquity for surveying a target point. The direction or angle and usually also the distance from a measuring device to the target point to be surveyed are recorded and also in particular the absolute position of the measuring device in addition to possibly existing reference points are registered as spatial standard data.

Generally known examples of such geodetic surveying devices are represented by the theodolite, tachymeter, and total station, which is also referred to as an electronic tachymeter or computer tachymeter. A geodetic measuring device of the prior art is described, for example, in published application EP 1 686 350. Such devices have electro-sensory angle measuring functions and possibly distance measuring functions, which permit a determination of direction and distance to a selected target. The angle or distance variables are ascertained in the internal reference system of the device and must optionally still be linked to an external reference system for absolute position determination.

In many geodetic applications, surveying of points is performed by placing specially designed target objects thereon. These target objects usually consist of a surveying stick having a reflector (for example, a 360° prism) for definition of the measuring route or the measuring point. In the case of such surveying tasks, to control the measuring procedure and to establish or register measuring parameters, a number of data, instructions, language, and further items of information are transmitted between target object—in particular a handheld data acquisition device on the side of the target object—and central measuring device. Examples of such data are the identification of the target object (type of the prism used), inclination of the surveying stick, height of the reflector above ground, reflector constants, or measured values such as temperature or air pressure. These items of information or situation-related parameters are necessary to allow high-precision targeting and surveying of the measuring point defined by the surveying pole having prism.

Modern total stations normally have a compact and integrated construction, wherein usually coaxial distance measuring elements and also computer, control, and storage units are provided in one device. Depending on the expansion stage of the total station, motorization of the targeting or aiming apparatus and also—in the case of the use of retroreflectors (for example, a 360° prism) as target objects—means for automatic target search and tracking can also be integrated. As a human-machine interface, the total station can have an electronic display-control unit—generally a microprocessor computer unit having electronic data storage means—having display screen and input means, for example, a keyboard. The measured data acquired in an electro-sensory manner are supplied to the display-control unit, so that the position of the target point can be ascertained, optically displayed, and stored by the display-control unit. Total stations known from the prior art can furthermore have a wireless data interface to establish a wireless connection to external peripheral components, for example, to a handheld data acquisition device, which can be implemented in particular as a data logger or field computer.

For aiming at or targeting the target point to be surveyed, geodetic surveying devices of this type have a telescopic sight, for example, an optical telescope, as an aiming apparatus. The telescopic sight is generally rotatable about a vertical standing axis and about a horizontal tilt axis in relation to a base of the measuring device, so that the telescopic sight can be aligned on the point to be surveyed by pivoting and tilting.

The optical system or the optical viewing channel of the aiming apparatus usually contains an objective lens group, an image inversion system, a focusing optic, a reticle to generate crosshairs, and an ocular, which are arranged in this sequence from the object side, for example. The position of the focusing lens group is set depending on the object distance such that a sharp object image results on the reticle, which is arranged in the focal plane. This can be observed through the ocular or registered on the basis of a coaxially arranged camera, for example.

For example, the construction of this type of telescopic sights of geodetic devices is disclosed in EP 1 081 459 or EP 1 662 278.

Since target objects (for example, the surveying poles which are usually used for geodetic purposes, having target marks such as a 360° prism) often cannot be targeted sufficiently precisely (i.e., not in accordance with geodetic precision requirements) with the naked eye on the basis of the aiming apparatus in spite of the 30-fold optical enlargement which is often provided, in the meantime, conventional surveying devices have as a standard feature an automatic target recognition function for prisms used as the target reflector (ATR: "automatic target recognition"). For this purpose, a further separate ATR light source—for example, a multimode fiber output, which emits optical radiation having a wavelength in the region of 850 nm—and a special ATR detector sensitive for this wavelength (for example, a CCD surface sensor) are conventionally additionally integrated in the telescope. For example, a surveying device having a function for automatically targeting a retroreflective target and having an automatic target recognition functionality is described in EP 2 141 450.

Modern devices can have, in addition to the optical viewing channel, a camera, which is integrated in the telescopic sight and is aligned coaxially or parallel, for example, for acquiring an image, wherein the acquired image can be displayed in particular as a live image on the display screen of the display-control unit and/or on a display screen of the peripheral device—for example, the data logger—used for remote control. The optic of the aiming apparatus can have a manual focus—for example, an adjustment screw for changing the position of a focusing optic—or can have an autofocus, wherein the change of the focus position is performed by servomotors, for example.

For example, such an aiming apparatus of a geodetic surveying device is described in EP 2 219 011. Automatic focusing apparatuses for telescopic sights of geodetic devices are known, for example, from DE 197 107 22, DE 199 267 06, or DE 199 495 80.

By means of such an image acquisition unit, in addition to surveying specific target points, images of a measuring scene can also be acquired. Therefore, an object to be surveyed can be acquired in the image and optionally displayed to a user on a display screen of the surveying device. Further items of information for the object can be derived based on this image.

By corresponding image processing, for example, a surface composition for the object or a spatial extension of the object can be at least coarsely determined. The spatial extension or the shape of the object can be determined by means of edge extraction on the basis of the image.

For more precise determination of these object properties, in addition to the items of image information, items of position information can be considered for one or more points, which lie on the object. For this purpose, the one point or the multiple points are precisely targeted and surveyed using the surveying device. The points thus determined with respect to their position are processed as so-called support points together with the image information, whereby a more precise specification can be made, for example, about the location of the object part acquired in the image.

However, it is disadvantageous in this case that in particular the location determination for the imaged object part can only be performed depending on the determined support points and good precision is only achievable with an increasing number of support points. Such a point acquisition using a total station, for example, would mean, however, a disproportionately high time consumption (in comparison to an image acquisition of the object). In addition, the shape of the object part (for example, if the object has a curved surface) can also only be ascertained or approximated with limited precision by means of the image processing.

In addition, in the case of the task of surveying the object from different perspectives, the problem results of precise linkage of acquired image data (corresponding to the setup positions of the surveying device). Such a linkage can partially be performed reliably and precisely in the case of support points which can be jointly acquired for the images to be linked, however, the jointly determinable support points for this purpose usually cannot be targeted from every setup position as a result of the different perspectives relative to the object. Typically, the images are joined together by means of further image processing of the overlapping edge regions of the images.

BACKGROUND

Some embodiments of the present invention provide an improved surveying device or an improved surveying method, which allows more rapid and precise object determination.

Some embodiments provide for the provision of a surveying device, using which an object can be acquired from different perspectives, wherein the object data ascertained from the perspectives can be linked more rapidly and precisely to determine an object property.

SUMMARY

The invention relates to a method for surveying an object for and using a geodetic surveying device. In the scope of the method, a derivation of an item of surface information is performed at least for one object region, in particular with respect to a shape and/or spatial extension of the object, and at least one geodetically precise single point determination is performed for an object point within the object region, wherein a position of the at least one object point is determined geodetically precisely.

Furthermore, according to the invention, scanning is carried out to derive the item of surface information, using object-point-independent scanning of the object region by progressive alignment changes of the measuring radiation, with determination of a respective distance and a respective alignment of the measuring radiation emitted for the distance measurement for scanning points within the object region, in particular in a predetermined scanning point resolution, and with generation of a point cloud which represents the item of surface information and has the scanning points. In addition, the item of surface information is updated based on the determined position of the at least one object point.

The updating of the item of surface information is performed in particular in such a manner that an (updated) item of surface information resulting therefrom has an (optimized) object-faithful reference, i.e., the resulting item of surface information represents at least the object region more precisely (for example, with respect to location, size, and/or shape of the object region). Therefore, in particular a realistic representation of the object region or the object is provided by this update.

In particular the positions of the scanning points in an object coordinate system (for example, in an internal reference system of a surveying device) are determined by the determination of the alignment of the measuring axis and the distance for respective scanning points.

Furthermore, the update of the item of surface information is performed based on the determined position of the at least one object point, in particular automatically, in particular automatically as soon as the scanning and single point measurement is carried out.

According to one specific embodiment of the invention, in the scope of the single point determination, measuring radiation is aligned precisely on the at least one object point and during the (uniform) alignment of the measuring radiation on the at least one object point, the position of the at least one object point is determined geodetically precisely by means of the measuring radiation, in particular by alignment determination for the measuring radiation and distance measurement by means of the measuring radiation.

According to an alternative embodiment according to the invention, the position of the at least one object point is derived by means of acquisition from GNSS signals and generation of GNSS position information, in particular wherein a GNSS receiving unit is positioned in a known relative position to the object point and the GNSS position information is generated by the GNSS receiving unit.

According to the invention, therefore both an object surface or at least a subregion of this surface can be scanned in a planar manner, using a predetermined point-to-point resolution and a scanning measuring rate of, for example, 100-10,000 measuring points per second (and with a measuring range corresponding to geodetic scales) and also a single point of the object can be determined with high precision and can be surveyed, for example, in the case of fixed alignment of the measuring radiation on the single point or by placing a surveying pole having a GNSS receiver at the point.

By way of the scanning, a point cloud is derived for the object to be surveyed, wherein the position, orientation, and scaling of the cloud is then firstly known and determined in the internal coordinate system of the surveying device. In the case in which the surveying device is already calibrated in an external coordinate system or is referenced thereto before the scanning (i.e., at least the orientation of the device is determined in this higher-order system), the point cloud can be determined directly in this external coordinate system.

The scanning and single point determination are executed using a correspondingly implemented surveying device, in particular a total station, at the same setup point, so that a coordinative correct update of the item of surface information can be performed. In addition, in particular a surveying stick having a GNSS receiver (GPS, GLONASS, or Galileo) is provided for the acquisition of the item of GNSS information, which is positioned on the point to be surveyed and makes an item of position information derivable thereon, wherein this item of information is transmittable to the surveying device.

The method according to the invention for object surveying is thus executed in particular on and using a corresponding surveying device, without a post-processing step being necessary for the data processing.

Because the single points are also surveyed within the (angle) range (scanning range) which is scanned, the point cloud acquired by the scanning can be adapted in particular with respect to the location thereof by making use of the high-precision determined positions for the individual object points.

A single scanning point (i.e., one point of the point cloud) does not have to correspond to a single measuring point (i.e., a numeric value pair, which is acquired during scanning, for alignment and distance). A scanning point (in particular its position in the internal reference system of the surveying device) can rather be calculated from multiple measuring points, for example, by averaging based on the positions of the multiple measuring points. These measuring points are acquired, for example, during the continuous movement of the measuring radiation and simultaneous acquisition of measured values over a surface which is correspondingly scanned at this time on the object. Thus, for every scanning point, a direction and a distance to the surface to be surveyed can also be derived from multiple distance and direction values for multiple measuring points. A precision increase is thus achievable.

According to one special embodiment of the invention, in the scope of the updating of the item of surface information, the surface and/or a volume for the object region, in particular for the object, is determined, wherein the determined position of the at least one object point is processed together with the point cloud, in particular wherein a surface value or a volume value is calculated, respectively.

Furthermore, according to the invention, the item of surface information in particular specifies a location and/or at least partially a spatial extension of the object.

In this context, the area and/or the volume of the object can thus be determined more precisely by the scanning and single point determination, since, for example, individual surface sections of the object can be determined more precisely with respect to the size, location, and/or shape thereof by considering the geodetically precisely determined object points, and therefore area and volume calculations can accordingly be carried out more precisely.

The point cloud is processed according to a further embodiment according to the invention in such a manner that a coherent area is approximated based on the positions of the scanning points, wherein the area represents the item of surface information, in particular wherein the scanning points lie in the area. Such a derivation of the coherent area can be performed, for example, by means of equalization calculus, in particular by regression, triangulation of the scanning points and/or single points, or a "best fit" method. Therefore, an area (with respect to its spatial extension and location in the object coordinate system) can be calculated, which represents the determined scanning points and is usable for further calculation, for example, for a volume or surface determination for the object.

By way of the surveying method according to the invention, in addition, precise monitoring of objects, for example, structures (for example, dam walls, bridges) is made possible. Shape changes, volume changes, movements of the construction substance, or similar processes can be observed. According to one special embodiment, the object surveying method is executed multiple times offset in time in this context, wherein the respective presently generated item of surface information for the object is compared to at least one previously generated item of surface information, in particular wherein a surface and/or volume property determined during the surface and/or volume determination is respectively compared accordingly.

The object monitoring is thus performed, for example, on the basis of a surface or a volume determined for the object. This item of information is determined during an initial surveying of the object and is compared to a corresponding item of information calculated during a later measurement of the object. The measurements can be performed in this context at a time interval of seconds to months.

A point cloud acquired by means of scanning can furthermore be compared to design data (for example, CAD data, which specify an intended shape and spatial intended extension for an object), wherein on this basis an intended-actual comparison can be carried out for the object represented by the design data and the point cloud.

With respect to a wide-ranging acquisition of an object (i.e., acquisition of the object, for example, from different directions or perspectives, so that multiple subregions of the object surface can be acquired), according to a further embodiment of the invention, at least one further derivation of a further item of surface information is performed for a further object region of the object, wherein the further item of surface information is derived based on a generation of a further point cloud by scanning the further object region. In this case, in particular the one further item of surface information for the further object region is updated based on a further surveyed object point, in particular wherein the one further surveyed object point is determined by at least one further geodetically precise single point determination for the at least one further object point of the further object region.

The scanning of the object regions and in particular the single point determination for the object points are performed in this case in particular from different perspectives, in particular in different setup positions of the geodetic surveying device, relative to the object.

With respect to the generation of multiple point clouds, the (first) point cloud and the one further point cloud in particular jointly represent the item of surface information, in particular wherein the updating of the item of surface information for the object is performed based on the point clouds and on the at least one object point and the at least one further surveyed object point.

By way of the acquisition of the multiple point clouds for one object or multiple objects from different perspectives—i.e., scanning and single point determination from respective different setup points of the surveying device (total station) used for this purpose or by means of multiple surveying devices set up at different positions—regions of the object or the objects can thus be acquired, which are not accessible using the measuring radiation from a single setup position. These regions are scanned and respective items of surface information, for example, a respective associated area, are extracted for this purpose.

According to the invention, in the scope of one specific embodiment, referencing of the one further point cloud and in particular the at least one further object point is performed in such a manner that the location thereof in an object coordinate system is determined, in particular wherein by the referencing, the (first) point cloud and the one further point cloud and also in particular the at least one object point and the at least one further object point are provided jointly in the object coordinate system.

In particular, according to the invention, at least one reference point can provide a reference of the object coordinate system to an external coordinate system for the referencing, wherein the referencing is performed by a precise single point determination for the at least one reference point, in particular wherein in the setup position, in which one of the point clouds for the object is acquired, the at least one reference point is surveyed. Advantageously, by way of the referencing of the item of surface information in a higher-order coordinate system (for example, Earth's coordinate system), mobile monitoring can be implemented according to the invention, in that the object is surveyed in a first setup position and for this purpose the item of surface information is determined according to the invention, and this item of surface information is referenced in the higher-order coordinate system. The generated point cloud is thus registered in the higher-order coordinate system and the orientation (in particular location and scaling) of the cloud is known therein.

At a later point in time, the object can be scanned again after the surveying device is set up again (also possible at a different setup point), and the points point cloud then generated can be registered similarly to the first surveying in the higher-order coordinate system. Because the two point clouds are then known in the same higher-order coordinate system i.e., for example, the locations and sizes thereof, the items of surface information generated by means of these point clouds can be compared to one another and therefore monitoring of the object can be performed.

The referencing of the point clouds is also executed, according to one special embodiment, directly on and using the surveying device, so that no additional post-processing is necessary for this step. The control unit of the surveying device is equipped, i.e., configured correspondingly, in this context for executing a corresponding functionality for the referencing (registration of point clouds in an external coordinate system).

With respect to the updating of the item of surface information, according to the invention, in the scope of the single point determination, in particular an object point is surveyed as a support point for the object region and its position is determined, wherein the support point is considered for the definition of the object region, in particular for the definition of the surface in the scope of the updating of the item of surface information.

In the scope of the surveying method according to the invention, according to one special embodiment, an object model is generated at least for the one object region (which was scanned by means of scanning) as a function of the item of surface information, in particular as a function of the point cloud, and of the determined position of the at least one object point. Such a model can be prepared or calculated by means of triangulation based on the acquired scanning points, for example.

For such a model, for example, surface segments of an object, which are extracted from point clouds (for example, by means of approximation with regard to position and size of an area on the distribution of the scanning points), are joined together in consideration of the additionally surveyed single object points, and a realistic image of the object is generated therefrom in a computer-based manner.

Furthermore, according to one special embodiment according to the invention, filtering of the scanning points of the point cloud is carried out as a function of a fulfillment of a defined consideration criterion, in particular with respect to a location of the scanning points within an intended measuring region, wherein the scanning points are considered as a function of the filtering for the updating of the item of surface information.

One such consideration criterion can be given, for example, by geometric shapes, wherein only those scanning points of the point cloud, which lie within such a shape, are processed. In this context, for example, a region relevant for the surveying can be predefined, in particular by definition of a polygon in an image, in which the object to be surveyed is acquired, and only the scanning points within the polygon are used and processed as the item of surface information. Thus, for example, precisely the points which lie between a left and a right road boundary can be considered for the surveying of the road.

In relation to a consideration of currently provided measuring conditions, in the scope of the object surveying method, in particular additionally an item of atmospheric state information is acquired and/or an item of geometric measuring information is defined, in particular meteorological data and/or measurement axes errors, wherein In particular, in this context, during the determination of the distance for the respective scanning points, in particular during the determination to the at least one object point, the item of atmospheric state information and/or item of geometric measuring information is processed and, based thereon, a distance correction for the determination of the respective distance is performed. Alternatively or additionally, the scanning points determined in the scope of the scanning can be adapted with respect to their position, in particular the location of the point cloud in the object coordinate system, based on the items of atmospheric state information and/or the item of geometric measuring information.

In other words, during a measuring procedure (single point determination or scanning), such an item of state information can also be acquired and a measurement correction can be performed based on this item of information. The correction can be ascertained, for example, by means of a "look-up table", by which, for example, an associated correction value is defined for a specific ambient temperature.

According to the invention, the method is executed in particular by and using the geodetic surveying device (total station, multistation, or tachymeter), wherein the surveying device has at least one scanning functionality for the scanning acquisition of the scanning points and generation of the point cloud and a single point determination functionality for the high-precision position determination for at least one object point.

In particular, the geodetic surveying device is implemented according to one of the embodiments according to the invention described hereafter.

With respect to the determination of the position of the at least one object point (single point determination) by means of GNSS signals, the method is executed according to the invention in particular by a system composed of surveying device and GNSS receiving unit, in particular wherein the system is implemented according to an embodiment according to the invention for the system described hereafter.

The invention therefore also relates to a geodetic surveying device, in particular a total station or multistation, for surveying an object, having a base which defines a pivot axis, having a structure, which is arranged on the base and is pivotable about the pivot axis relative to the base, wherein the structure defines a tilt axis, which is substantially orthogonal to the pivot axis, and having a targeting unit, in particular a telescopic sight, wherein the targeting unit is arranged so it is pivotable about the tilt axis in relation to the structure and has an emission unit having a radiation source for generating and emitting measuring radiation. In addition, the surveying device has a distance measuring functionality for measuring distances to points, an angle measuring functionality for measuring an alignment of the measuring radiation, and a control and processing unit for data processing and for control of the surveying device. Furthermore, a single point determination functionality is provided, upon the execution of which, controlled by the control and processing unit, a position of at least one object point within at least one (determined) object region is determined geodetically precisely.

According to the invention, the geodetic surveying device additionally has a scanning functionality for deriving an item of surface information at least for one object region, wherein upon execution of the scanning functionality, controlled by the control and processing unit, object-point-independent scanning of the object region is performed by progressive alignment changes of the measuring radiation, a respective distance and a respective alignment of the measuring radiation emitted for the distance measurement are determined for scanning points within the object region, in particular in a predetermined scanning point resolution, and a point cloud, which represents the item of surface information and has the scanning points, is generated. In addition, an object determination functionality is provided, upon the execution of which, controlled by the control and processing unit, the item of surface information is updated at least for the one object region, in particular for the object, based at least on a position of the at least one object point, which is determined by the single point determination functionality.

According to one special embodiment according to the invention of the surveying device, the control and processing unit is configured in such a manner that an above-described method according to the invention for surveying an object is executable using the geodetic surveying device.

According to one specific embodiment of the geodetic surveying device according to the invention, upon execution of the single point determination functionality, a high-precision alignment of the measuring radiation on the at least one object point within the object region is performed and during the (fixed, uniform) alignment of the measuring radiation on the at least one object point, by means of the measuring radiation, the position of the at least one object point is determined geodetically precisely, in particular by alignment determination for the measuring radiation and distance measurement to the object point on the object surface by means of the measuring radiation.

For improved user-friendliness, the surveying device can in particular have a remote control unit having an analysis unit, wherein the object determination functionality is executable by the analysis unit, and/or it can have a display unit for displaying measuring information, in particular wherein a scanning progress can be displayed by at least partial display of scanning points of a point cloud.

To acquire further items of position-relevant information, the surveying device according to the invention has, in a special expansion stage, a GNSS module for acquiring GNSS position information (for example, GPS, GLONASS oder Galileo), in particular wherein the GNSS position information can be processed for position correction of the scanning points and/or the point cloud in the external coordinate system and/or for measured value adaptation during the scanning point surveying and/or reference point surveying.

The surveying device can be implemented in particular in such a manner that the targeting unit has an imaging system having an imaging optic, which has a focusing group, and an image plane for the generation and graphic display of an image of a targeting field of vision, in particular wherein the targeting field of vision is defined by the imaging system and the image of the targeting field of vision can be provided in a graphically sharp manner in the image plane by means of image focusing by the focusing group.

The invention additionally relates to a system composed of an above-described geodetic surveying device according to the invention and a GNSS receiving unit. The GNSS receiving unit is implemented in this case for receiving GNSS signals and for generating GNSS position information from the GNSS signals, is positionable so it is movable in relation to the geodetic surveying device, and is implemented in such a manner that the GNSS position information is transmittable to the geodetic surveying device, in particular wherein the geodetic surveying device has a GNSS data receiving unit. Upon execution of the single point determination functionality, according to the invention, the determination of the position of the at least one object point is performed based on GNSS position information generated by means of the GNSS receiving unit, wherein the GNSS receiving unit is provided in a known relative position in relation to the object point.

The invention additionally relates to a computer program product having program code which is stored on a machine-readable carrier. The computer program product is configured to control the scanning and the single point determination and to carry out the updating of the item of surface information according to an above-described method for object surveying, in particular when the program is executed on an electronic data processing unit, which is implemented as a control and processing unit of a surveying device or system according to the invention, or on an electronic data processing unit, which is implemented as an analysis unit of a surveying device according to the invention.

BRIEF DESCRIPTION OF THE DRAWINGS

The method according to the invention and the device according to the invention will be described in greater detail hereafter solely as examples on the basis of specific exemplary embodiments which are schematically shown in the drawings, wherein further advantages of the invention will also be discussed. In the figures.

Figure 1:
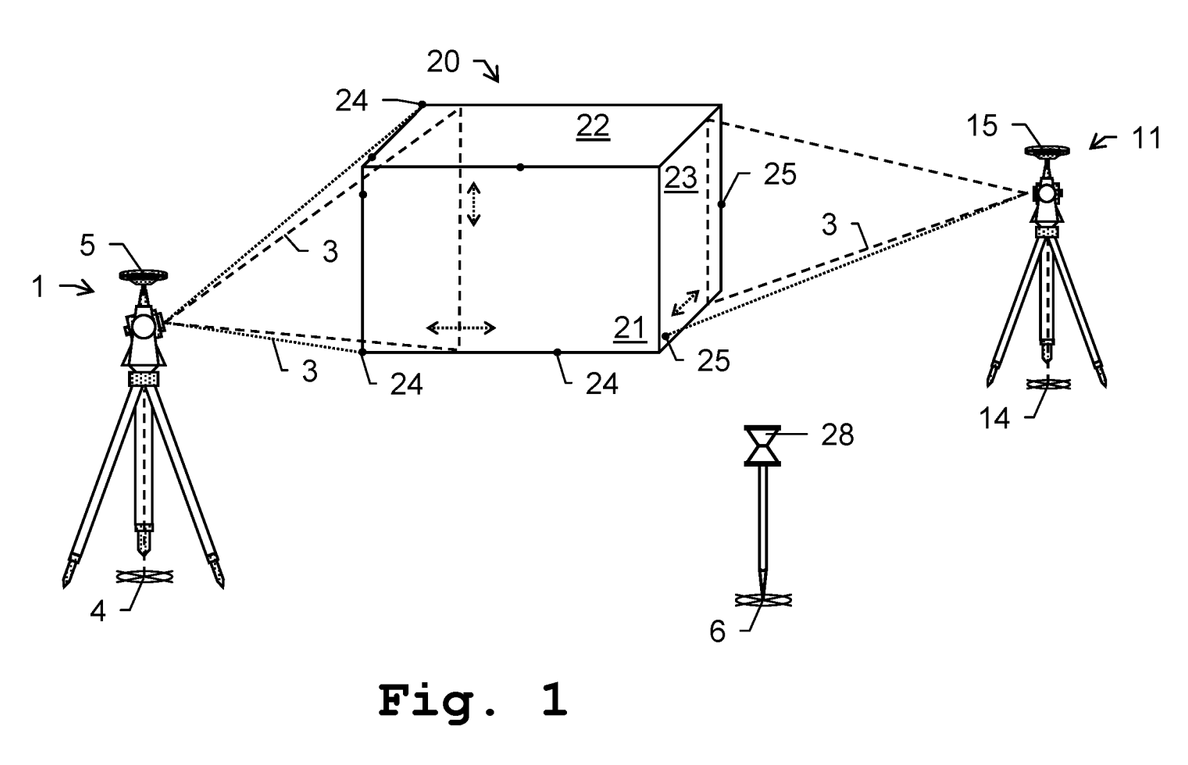
FIG. 1 shows two geodetic surveying devices according to the invention and the acquisition of an object from different perspectives thereby.

FIG. 1 shows two geodetic surveying devices 1, 11 according to the invention (total stations or multistations), an object 20 to be surveyed, and a retroreflector 28. With the use of multiple surveying devices 1, 11, the object 20 can be acquired from different perspectives or a larger measuring region can be covered.

A "multistation" has the typical functionalities of a total station and additionally has a rapid and high-precision scanning functionality, wherein more rapid and precise alignment of the targeting apparatus can be achieved using improved (more rapidly activatable and more rapidly acting, higher performance) control motors. It is thus possible to scan a plurality of points in a predefined measuring region in a relatively short time by way of a continuous movement of the measuring radiation 3 and to generate a corresponding point cloud having the scanned points. For example, 1000 or 10,000 or more measuring points per second can thus be acquired during the change of the alignment of the measuring radiation (for scanning the object 20). This scanning procedure, as a result of the achievable measuring precision (precision in the scope of a (with respect to the measuring duration) corresponding geodetically precise single point surveying) in conjunction with the high measuring speed and the scanning point resolution thus implementable, can be referred to as real scanning. A single scanning point (i.e., one point of the point cloud) does not have to correspond to a specific measuring point in this case. One scanning point (in particular its position in the internal reference system of the surveying device) can rather be calculated from multiple measuring points, for example, by averaging based on the positions of the multiple measuring points. Thus, for each scanning point, a direction and a distance to the surface to be surveyed can also be derived from multiple distance and direction values for multiple measuring points. A precision increase is thus achievable.

The object 20 is scanned in a first setup position of the first surveying device 1 (=positioning of the device 1 at a first setup point 4) from a first perspective, wherein a corresponding first point cloud 20a (cf. FIG. 2a) is generated in the internal reference system of the surveying device 1. The point cloud 20a consists in this case of scanning points 41, which were acquired on the surfaces 21, 22 of the object 20 using the surveying device 1, and therefore represents an item of surface information for the two object regions 21, 22 of the object 20. The item of surface information specifies here at least a geometric shape of the object 20 or of the object regions 21, 22. The further surface 23 of the object 20 cannot be targeted or scanned originating from the setup position 4.

In addition, geodetically precise surveying of additional single points 24 of the object 20 is performed in this first setup position. For this purpose, the measuring radiation 3 is aligned precisely on the respective object point 24 and, in this alignment, a distance to the point 24 and (by angle measuring using the surveying device 1) the alignment of the measuring radiation 3 are determined. The single point measurement (single point determination) is performed independently of the scanning of the object 20. Such a single point measurement to a point 24 can be executed, for example, with the aid of a reflector or a surveying stick having reflector, wherein the surveying stick is positioned having its bottom side, which tapers to a point, on the point 24 and the reflector on the stick is targeted. The position of the point can then be determined therefrom by a known relative positioning of stick tip to the reflector.

Alternatively to the single point determination by means of the measuring radiation 3, according to the invention, the position of the single object point 24 (or multiple such points 24) can be determined by processing received GNSS signals (for example, GPS, GLONASS, or Galileo signals) (not shown here). For this purpose, for example, a receiver implemented correspondingly to receive the signals is positioned at the point to be surveyed and the position of the receiver is determined by GNSS data received in this position. In particular, a surveying pole is used for this purpose, which has such a receiver on a first end side and is placed with a second end side, which tapers to a point, on the point. The relative position of pole tip to receiver position is known in this case and allows a calculation of the point, at which the pole is standing. In addition, sensors can be provided for acquiring an inclination of the pole, wherein the inclination values which can thus be determined can be considered in the position calculation.

Data which are acquired, preprocessed, and/or generated by means of such a GNSS unit are transmitted to a surveying device according to the invention and further processed by the surveying device to execute the update of the item of surface information according to the invention.

Figure 2A:
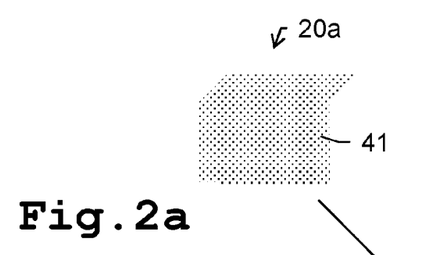
FIGS. 2a-c each show point clouds, which are generated in the scope of scanning or referencing according to the invention, for an object.

The item of surface information for the object 20 is updated according to the invention on the basis of these two measurements (scanning and single point measuring). The point cloud 20a is processed together with the single points 24 for this purpose.

This is achieved in particular by a firstly performed derivation of the item of surface information from the point cloud 20a, for example, as an area segment represented by the point cloud 20a, the shape and spatial extension of which can be calculated on the basis of the point cloud. By means of the single object points 24, which are additionally surveyed with high precision, a position of the area segment can then be determined or the position of the segment which can be derived by way of the scanning points can be adapted, so that the surface of the object 20 or of the scanned object segment is determined precisely (especially with geodetic precision). The location of the area is thus especially approximated at the positions of the additionally determined single points 24.

In this case, more precise location determination for the point cloud is carried out by the object point 24 (or the multiple object points 24) determined with high precision. The single points 24 can be used for this calculation, for example, for the precise definition or surveying of the object boundaries (for example, the edges of the object). In addition, an exact determination of the object surface can be achieved by one or multiple surveyed single points 24, wherein, for example, multiple single points 24 are surveyed in a critical region of the object 20 (which can only be acquired with a low scanning point resolution, for example).

For example, a more precise area value for the object regions 21, 22 can also be determined as the item of surface information from the calculation of the scanning points of point cloud 20a having the object points 24 (in particular with respect to the measured positions thereof).

Using the second surveying device 11, the object 20 is scanned from a second setup position 14, i.e., from a second perspective. During the scanning procedure using the second surveying unit, the area 23 of the object 20 is acquired and a corresponding point cloud 20b (compare FIG. 2b) having scanning points 41 is generated, wherein the two areas 21, 22 can no longer be targeted using the measuring radiation 3 from the second perspective of the second device 11.

Also in this setup position 14, further single points 25 for the object region 23 are surveyed, wherein these single points 25 can in turn be taken into consideration to generate and update a further item of surface information, which permits a precise object determination, for example, in regard to the location of the object 20, for the object region 23.

Figure 2B:
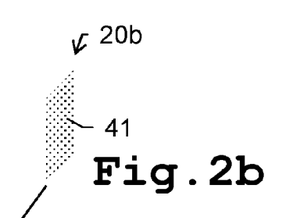

The two point clouds 20a-b are firstly provided in two different internal coordinate systems, which are assigned to the respective surveying device 1, 11. Therefore, there is no relative reference of the two point clouds 20a-b to one another.

To obtain a mutual point cloud 20c (cf. FIG. 2c), which represents both the areas 21, 22 and also the area 23 of the object 20 in a position-faithful manner, the locations of the two point clouds 20a-b are mutually referenced to one another. The referencing of the point clouds 20a-b in a mutual coordinate system can be achieved in that the first surveying device 1 (as a reference point) is targeted with high precision by the second device 11 in the scope of a single point survey and a distance between the devices 1, 11 and an alignment of the second device 11 is acquired in this case. In addition, the second device 11 is accordingly targeted by the first. The relative position and alignment of the surveying devices 1, 11 (and therefore also of the internal coordinate systems) is thus known and the two point clouds 20*a-b* can be transferred into a mutual coordinate system (for example, in the coordinate system of the first surveying device, which is to be considered to be the external coordinate system in this case) or mutually referenced therein.

Figure 2C:
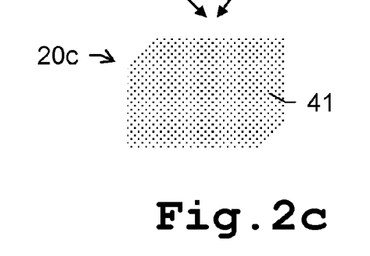

By way of the referencing, the point clouds 20*a-b* can be linked in relation to one another and the scanning points thereof can be combined to form an overall point cloud 20*c*, in such a manner that the object 20 is represented more comprehensively by this combined point cloud 20*c* than by only one of the point clouds 20*a-b*.

The two surveying devices 1, 11 can additionally each have a GNSS receiver 5, 15, by which respectively an item of position information of a satellite signal can be received (for example, GPS signals, GLONASS signals, or Galileo signals). By means of this item of position information, an absolute position in the Earth's coordinate system can be determined for each of the surveying devices 1, 11, wherein in addition the absolute alignment of the devices can be determined (for example, North-East alignment) by the alignment which can also be determined (see above: mutual targeting, however, the determination of the measuring direction is sufficient for this purpose) of the devices 1, 11. Using these items of information, the point clouds 20*a-c* can be registered in this external coordinate system (Earth's coordinate system). The locations of the point clouds 20*a-c* and also the location (position and alignment) of the object 20 may thus be determined in this system.

Alternatively to the use of the two surveying devices 1, 11, a single surveying device can be set up successively at the two setup points 4, 14 and the object 20 can be scanned and the point clouds 20*a-b* can be generated thereby in each case. For each setup position of the surveying device, referencing according to the invention of the respective prepared point cloud 20*a-b* is then performed in relation to a higher-order coordinate system, for example, by precise single measuring of the reflector 28, the position 6 of which is known in this higher-order coordinate system (in the case of the respective known setup position 4, 14). Both point clouds 20*a-b* can therefore be referenced in a mutual coordinate system (in particular the object coordinate system).

If the positions of the setup points 4, 14 are not known, calibration in an external coordinate system (for each surveying device 1, 11 individually) can be performed in that in addition to the one target 28, which is known with respect to position, still further targets (not shown), the positions of which are also known in the external coordinate system, can be surveyed by means of the single point determination functionality—at least with respect to the direction in relation to these targets.

Furthermore, point clouds can be generated and mutually referenced or registered in a mutual coordinate system, in that a first point cloud is scanned in the first setup position and, in this setup position, a reflector is exactly surveyed in a second position using the single point determination functionality. Subsequently, the setup positions of reflector and surveying device are exchanged, a further point cloud is scanned, and the reflector is precisely measured by means of single point measurement and thus the relative position of the surveying device to the reflector is determined. By repeating these steps, i.e., setting up and precisely surveying the reflector at a third position and exchanging the position of the surveying device with the reflector (at the third position) and a further such "reverse measurement", a sequence of measurements referenced to one another ("traverse") can be generated. The point clouds generated in this case can therefore be provided and/or displayed in a mutual coordinate system—for example, on a display screen of the surveying device. By additional referencing in relation to an external coordinate system (for example, in relation to the Earth's coordinates), a location of the point clouds in this coordinate system can additionally be calculated, i.e., the absolute location of the point clouds (and objects represented thereby) is determined in the Earth's coordinate system.

Using this method, the object 20 can be acquired from different perspectives if only one surveying device is used, wherein the point clouds generated in this case (and the object surface sections represented by these point clouds) can be mutually referenced and are based at least on object data represented by the point clouds an item of object information are generated for the object 20 (for example, the entire coherent surface).

Using this method, bridging of terrain regions can also be performed, in which only reference points which are difficult to measure or no known reference points are present. A traverse is then begun at a first known reference point and further bridging points are provided by means of the surveying device and surveying of the position of a retroreflector in relation to the surveying device. A following measurement can be linked to these artificially provided points. Such a traverse is closed by measuring a further known last point. All reference points which are artificially provided in the course of the bridging can be updated in this case with respect to the positions thereof based on the known position of the last point. Correspondingly, a correction of the locations of point clouds prepared in the scope of the traverse can also be performed.

During preparation of multiple measurements referenced to one another, for example, in the scope of a traverse, the measured values generated in this case of the individual point clouds can be used for mutual adaptation of the measured values. I.e., if mutually overlapping measured regions have been acquired by scanning, respective multiple surveyed points can be determined by a comparison, in particular averaging, of the associated measured values, after the respective point clouds have been mutually referenced according to the invention by means of reference point measurement and the measurement points are known as coordinates in the same coordinate system.

Furthermore, if multiple multi-stations (total stations) are used, using which respectively a measurement and preparation of a point cloud is performed and an orientation to a reference point is determined, in the event of an update or adaptation of the coordinates of the reference point, a respective coordinate update can be performed for all point clouds acquired using the multi-stations, such that these point clouds are provided in updated form in a mutual coordinate system.

The respective referencing of the point clouds is performed according to the invention directly on a surveying device 1, 11 used for the acquisition of a point cloud. For this purpose, the device 1, 11 has a corresponding referencing functionality.

Figure 3A:
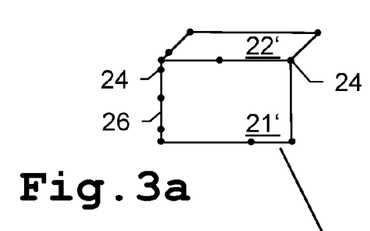
FIGS. 3a-c each show a reconstruction for an object surveyed by object surveying according to the invention.
Figure 3B:
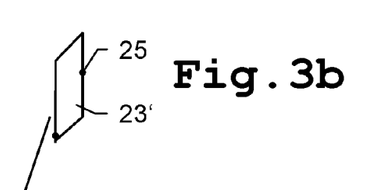
Figure 3C:
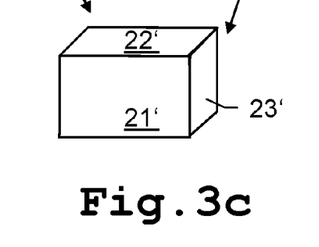

FIGS. 3*a-c* each show an at least partial reconstruction for the object 20 surveyed in the scope of the object surveying method according to the invention, wherein the reconstruction is based on scanning and single point measured data according to the statements on FIG. 1, and the object regions 21-23 are each represented as areas 21'-23'.

FIG. 3a shows a reconstruction of the object areas 21, 22. This model is based on the point cloud 20a, which is acquired by means of scanning, and the object points 24, which are individually surveyed with high precision by means of single point determination and are assigned to the object areas 21, 22. The point cloud 20a has been adapted with respect to the location and shape thereof by the surveyed single points 24, and corresponding surface areas 21', 22' have been derived therefrom. In addition, corresponding edges 26 and boundaries of the object 20 have been precisely determined on the basis of the single points 24, whereby a precise item of surface information is provided for the object regions 21, 22.

FIG. 3b shows a reconstruction of the object area 23. This model for the object area 23 is based on the point cloud 20b, which is acquired by means of scanning, and the object points 25, which are individually surveyed with high precision by means of single point determination, and are assigned to the object area 23.

FIG. 3c shows a reconstruction of the object 20. This image of the object 20 can be prepared, for example, based on the point clouds 20a-b, which are acquired by means of scanning, and the object points 24, 25, which are individually surveyed with high precision by means of single point measurements, and are assigned to the object areas 21-23. Alternatively, the model can be derived from the two partial models according to FIGS. 3a-b for the subregions 21, 22, 23 of the object 20.

The point clouds or the models are mutually referenced for this purpose in such a manner that the point clouds (or the respective object regions, respectively) are provided in a mutual coordinate system, i.e., the positions, orientations, and/or scales thereof are determined in the mutual coordinate system.

Figure 4A:
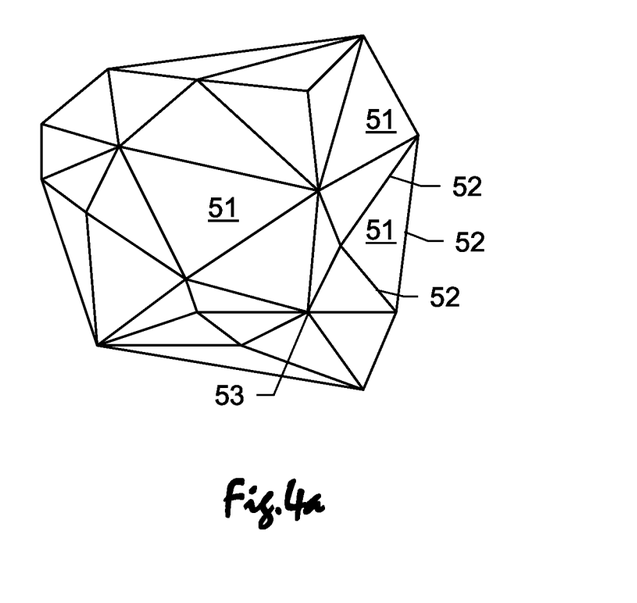
FIGS. 4a-b shows a model for an object generated on the basis of object surveying according to the invention.

FIG. 4a shows a "meshed" model for an object, i.e., a model consisting of lines, which are linked to one another and are assigned to the object, so that a model resulting therefrom obtains the form of a network having individual mesh. The model is derived on the basis of continuous scanning and single point measurement according to the invention for specific points on the object.

By scanning of the object, individual surface regions of the object are acquired in a planar manner and incorporated as associated modeled area segments 51 in the model such that an overall model for the object is provided by joining together the individual areas 51. For each surface region, a point cloud, which represents the region and possibly further regions and which therefore provides respective surface information, is generated.

The segments 51 are delimited from one another by respective boundary lines 52. These boundary lines 52 are determined based on respective single point measurements for single points on the object, wherein the location of the individual boundary lines 52 was calculated by positions of single points, which define a starting point and end point of the respective boundary line 52, for example. In particular, for the determination of the boundary lines 52, arbitrary points or significant points, for example, points along an edge of the body to be surveyed, can be surveyed on the object and taken into consideration for the (mathematical) reconstruction of the object. The boundary lines 52 are thus derived from the locations of individual surveyed points.

In addition, upon the acquisition of the object, regions or points typically result which are to be determined very precisely as a result of given measuring requirements. For such regions or points, node points 53, which are to be assumed to be fixed (unchangeable), having fixed positions are determined, to which the boundary lines 52 are oriented or to which the locations of the boundary lines 52 and/or areas 51 are adapted. In particular multiple single point measurements and averaging based on these multiple single point measurements are executed to determine such node points 53. For example, edges or corners of the object are surveyed as fixed node points 53.

Figure 4B:
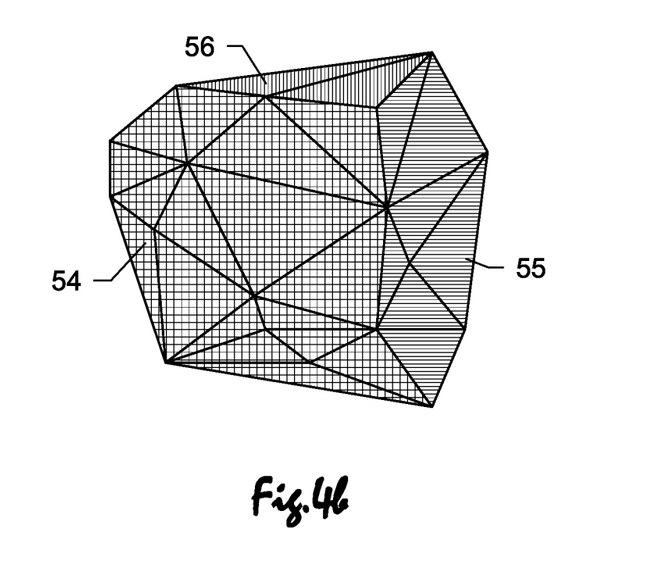

FIG. 4b shows the model according to FIG. 4a, wherein the areas 51 of the model are assigned to a respective setup position of the surveying device, using which the object regions were scanned. The area 54 represented by the checkered pattern comprises those object regions which were acquired from a first perspective of a first setup position of the device. The areas 55 marked by horizontal lines were acquired from a second perspective (using the same or an additional surveying device). And the vertically lined areas 56 were correspondingly scanned from a third setup position.

In the respective setup positions, multiple single points were additionally surveyed and determined in such a manner that the boundary lines 52 for the model are exactly definable, to optimize the location of the areas 51, which can be generated from the point clouds, with respect to the location precision thereof. For the definition of the boundary lines 52, the surveying of at least one point which can be assigned to the respective boundary line, in particular two points, is sufficient in this context.

Alternatively or additionally, a single point can be surveyed in the center of one of the areas 51, for example, and the location of the associated area can be adapted on the basis of the position determined thereby. The boundary lines result due to the intersection of two or more such areas, for example.

To prepare the model, mutual referencing of the point clouds acquired in the respective setup position is executed, so that the point clouds used for the model are provided in a mutual coordinate system and a realistic model can be prepared therefrom.

Figure 5:
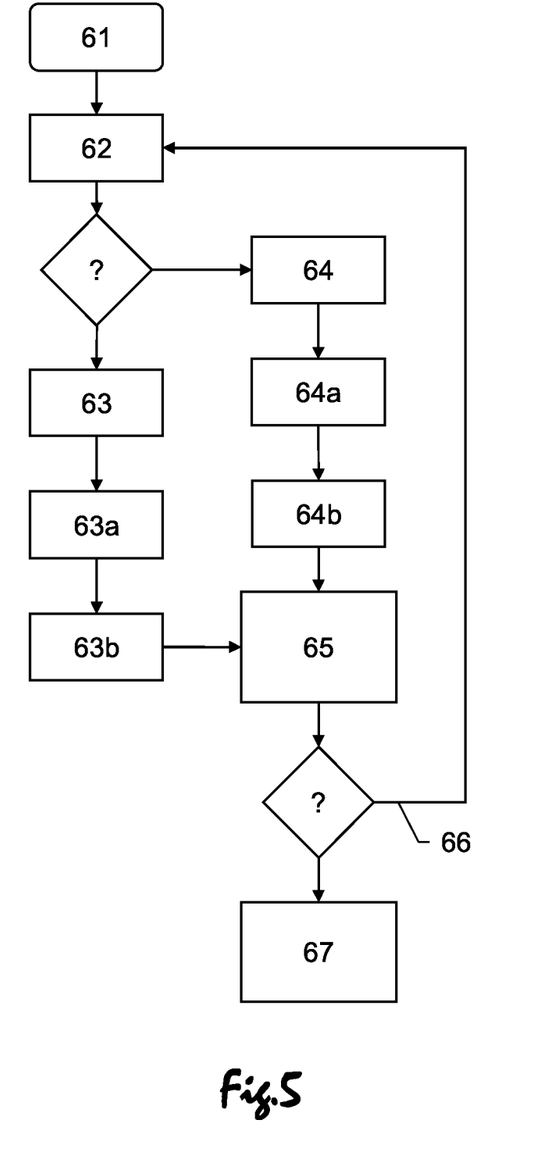
FIG. 5 shows a flow chart for a surveying process for volume determination for an object according to the invention.

FIG. 5 shows a flow chart of a surveying method for volume determination 61 for an object according to the invention.

For this purpose, firstly a total station having a scanning and single point determination functionality is set up 62 at a first setup point and coarsely aligned on the object to be surveyed, for example, a building.

Subsequently, either firstly scanning of the object surface 63 and then single point determination for single object points 64 are executed or the steps are executed in reverse sequence.

For the scanning 63 of the object area, a scanning region is defined 63a (corresponding to the region to be acquired on the object) and then the scanning is executed 63b as a function of the defined region by continuous movement of the measuring radiation, for example, meandering, within the scanning region and simultaneous acquisition of angle and distance values. A first point cloud for the scanned region is thus generated.

For the single point measurement 64, the measuring radiation—in contrast to the scanning—is precisely aligned 64a on a single object point to be surveyed of the object and this point is surveyed in a geodetically precise manner with uniform, fixed alignment of the measuring radiation and a position of the point is determined 64b, in that a distance value and a horizontal angle and a vertical angle are determined in this measuring beam alignment. The single point measurement is executed in this case for building edges in order to determine them exactly. Alternatively or also additionally, the single point determination 64 can be performed by means of reception of GNSS position signals and calculation of a position of the point from these signals. For this purpose, for example, a surveying pole having a corresponding GNSS receiver is placed at the point and horizontally aligned (for example, by means of a horizontal level) and in this alignment, the position for the receiver and the tip of the surveying pole (i.e., for the point) is derived. This position can then be transmitted for further object determination or for updating the item of surface information to the surveying device and processed further therein.

By using the precisely surveyed object points, the item of surface information represented by the point cloud is updated, in particular with respect to the location of the point cloud and an object area which can be derived from the point cloud. Therefore, a first surface for the object is derived 65, the location of which is determined more precisely by calculating the single point positions, from the point cloud generated by the scanning and the additionally surveyed object points.

As a function of whether a volume calculation is possible or can be executed with sufficient precision by way of the determined first surface for the object, the total station can be set up 66 at a second setup point and the steps 63-65 can be executed repeatedly in this setup position, wherein the object is surveyed from a second perspective. After the surveying in this second setup point, the generated point clouds are referenced in such a manner that they are provided in a mutual coordinate system and, by bringing them together, an expanded reconstruction of the object can be executed (having multiple object surfaces which were acquired from different perspectives).

In a last processing step 67, a surface for the object and additionally a volume for the object are calculated from the entirety of the performed scans and the surveyed single points. This can be performed, for example, in that an area is approximated from each point cloud and it is adapted with respect to location by means of the associated single points. The areas are then joined together such that a coherent area representing the surface results from the individual areas, from the shape and extension of which the volume content for the object can be derived.

It is obvious that the illustrated figures only schematically show possible exemplary embodiments. The various approaches can be combined according to the invention both with one another and with methods and devices for geodetic target surveying and with surveying devices, in particular total stations or multi-stations, of the prior art.

What is claimed is:

1. A method for surveying an object using a geodetic surveying device, the method comprising:
    deriving an item of surface information for at least one object region; and
    determining a position of at least one object point within the object region, wherein the position of the at least one object point is determined geodetically precisely,
    scanning to derive the item of surface information, wherein the scanning includes:
        object-point-independent scanning of the object region by progressive alignment changes of the measuring radiation,
        a determination of a respective distance and a respective alignment of the measuring radiation emitted for the distance measurement for scanning points within the object region, in a predetermined scanning point resolution, and
        a generation of a point cloud, which represents the item of surface information and has the scanning points, and
    updating the item of surface information based on the determined position of the at least one object point.

2. The method according to claim 1, wherein measuring radiation is aligned precisely on the at least one object point and upon the alignment of the measuring radiation on the at least one object point, the position of the at least one object point is determined geodetically precisely by means of the measuring radiation, by alignment determination for the measuring radiation and distance measurement by means of the measuring radiation.

3. The method according to claim 2, the item of surface information specifies a location and/or at least partially a spatial extension of the object.

4. The method according to claim 1, wherein the position of the at least one object point is derived using an acquisition of GNSS signals and generation of GNSS position information, wherein a GNSS receiving unit is positioned in a known relative position to the object point and the GNSS position information is generated by the GNSS receiving unit.

5. The method according to claim 1, further comprising determining a surface and/or a volume for the object region, wherein the determined position of the at least one object point is processed together with the point cloud.

6. The method according to claim 1, wherein the point cloud is processed in such a manner that, based on the positions of the scanning points, a coherent area is approximated, wherein the area represents the item of surface information, wherein the scanning points lie in the area.

7. The method according to claim 1, wherein the object surveying method is executed offset in time multiple times, wherein the respective present generated item of surface information for the object is compared to at least one previously generated item of surface information, wherein a surface and/or volume property determined during the surface and/or volume determination is respectively compared accordingly.

8. The method according to claim 1, further comprising performing at least one further derivation of a further item of surface information for a further object region of the object, wherein the further item of surface information is derived based on a generation of a further point cloud by scanning the further object region, wherein the one further item of surface information for the further object region is updated based on a further surveyed object point, wherein the one further surveyed object point is determined by at least one further geodetically precise single point determination for the at least one further object point of the further object region.

9. The method according to claim 8, wherein the scanning of the object regions and/or the single point determination for the object points are performed from different perspectives in relation to the object.

10. The method according to claim 8, wherein the point cloud and the one further point cloud jointly represent the item of surface information, wherein the update of the item of surface information for the object is performed based on the point clouds and on the at least one object point and the at least one further object point.

11. The method according to claim 8, wherein referencing of the one further point cloud is performed in such a manner that the location thereof in an object coordinate system is determined by way of the referencing, the point cloud and the further point cloud and the at least one object point and the at least one further object point are provided jointly in the object coordinate system.

12. The method according to claim 11, wherein at least one reference point provides a reference of the object coordinate system to an external coordinate system for the referencing, wherein the referencing is performed by precise single point determination for the at least one reference point in which one of the point clouds for the object is acquired.

13. The method according to claim 1, further comprising generating an object model at least for the one object region as a function of the item of surface information and of the determined position of the at least one object point.

14. The method according to claim 1, further comprising filtering of the scanning points of the point cloud as a function of a fulfillment of a defined consideration criterion, wherein the scanning points are considered as a function of the filtering for the update of the item of surface information.

15. The method according to claim 1, wherein
in the scope of the single point determination, an object point is surveyed as a support point for the object region and the position thereof is determined, wherein the support point is considered for the definition of the object region, and/or
in the scope of the object surveying method, an item of atmospheric state information is acquired and/or an item of geometric measuring information is defined, wherein
during the determination of the distance for the respective scanning points and/or during the determination of the distance to the at least one object point, the item of atmospheric state information and/or geometric measuring information is processed and, based thereon, a distance correction for the determination of the respective distance is performed and/or
the scanning points determined in the scope of the scanning are adapted with respect to the position thereof based on the item of atmospheric state information and/or geometric measuring information.

16. The method according to claim 1, wherein the method is executed by the geodetic surveying device, wherein the surveying device comprises:
a scanning functionality for the scanning acquisition of the scanning points and generation of the point cloud; and
a single point determination functionality for the high-precision position determination for the at least one object point;
a derivation of an item of surface information at least for one object region.

17. A non-transitory computer program product having program code, which is stored on a machine-readable carrier, such that when executed on an electronic data processing unit the computer program product is configured to:
control scanning and the single point determination; and
carry out the update of the item of surface information, of the method of claim 1.

18. Geodetic surveying device comprising
a base which defines a pivot axis,
a structure, which is arranged on the base and is pivotable about the pivot axis in relation to the base, wherein the structure defines a tilt axis standing substantially orthogonally to the pivot axis,
a targeting unit arranged so it is pivotable about the tilt axis in relation to the structure and has an emission unit having a radiation source for generating and emitting measuring radiation,
a distance measuring functionality for measuring distances to points,
an angle measuring functionality for measuring an alignment of the measuring radiation,
a control and processing unit for data processing and for controlling the surveying device, and
a single point determination functionality, upon the execution of which, controlled by the control and processing unit, a position of at least one object point within at least one object region is determined geodetically precisely, wherein:
a scanning functionality for deriving an item of surface information at least for the object region, wherein, upon execution of the scanning functionality, controlled by the control and processing unit object-point-independent scanning of the object region by progressive alignment changes of the measuring radiation,
a determination of a respective distance and a respective alignment of the measuring radiation emitted for the distance measurement for scanning points within the object region, and
a generation of a point cloud, which represents the item of surface information and has the scanning points, are performed, and
an object determination functionality, upon the execution of which, controlled by the control and processing unit, the item of surface information is updated at least for the one object region based on a position of the at least one object point determined by the single point determination functionality.

19. The geodetic surveying device according to claim 18, wherein upon execution of the single point determination functionality
a high-precision alignment of the measuring radiation on the at least one object point within the object region is performed, and
upon the alignment of the measuring radiation on the at least one object point by means of the measuring radiation, the position of the at least one object point is determined geodetically precisely.

20. A system comprising a geodetic surveying device according to claim 18 and a GNSS receiving unit, wherein the GNSS receiving unit:
is implemented to receive GNSS signals and generate GNSS position information from the GNSS signals,
is movably positionable in relation to the geodetic surveying device, and
is implemented in such a manner that the GNSS position information is transmittable to the geodetic surveying device, wherein
upon execution of the single point determination functionality, the determination of the position of the at least one object point is performed based on GNSS position information generated by means of the GNSS receiving unit, wherein the GNSS receiving unit is provided in a known relative position with respect to the object point.

* * * * *